(12) United States Patent
Elder

(10) Patent No.: US 6,191,496 B1
(45) Date of Patent: Feb. 20, 2001

(54) WIND TURBINE SYSTEM

(76) Inventor: Dillyn M. Elder, 1513 E. Lake St., Fort Collins, CO (US) 80524

(*) Notice: Under 35 U.S.C. 154(b), the term of this patent shall be extended for 0 days.

(21) Appl. No.: 09/452,734

(22) Filed: Dec. 1, 1999

Related U.S. Application Data

(60) Provisional application No. 60/110,519, filed on Dec. 1, 1998.

(51) Int. Cl.$^7$ .................................................. F03D 3/04
(52) U.S. Cl. .............................................. 290/55; 290/44
(58) Field of Search .................................... 290/43, 44, 54, 290/55

(56) References Cited

U.S. PATENT DOCUMENTS

| | | |
|---|---|---|
| 143,100 | 9/1873 | Sheplar et al. . |
| 175,530 | 3/1876 | Vernor . |
| 201,400 | 3/1878 | Everhart . |
| 399,171 | 3/1889 | Townsend . |
| 455,858 | 7/1891 | Pepper ............................ 416/197 A |
| 485,933 | 11/1892 | Herman . |
| 535,193 | 3/1895 | Chapman . |
| 537,494 | 4/1895 | Stevens et al. ...................... 415/907 |
| 588,572 | 8/1897 | Hardaway . |
| 600,893 | 3/1898 | Schmucker . |
| 640,901 | 1/1900 | Hardaway . |
| 993,120 | 5/1911 | Sterner . |
| 1,523,295 | 1/1925 | Ryan . |
| 1,583,165 | 5/1926 | Nicholson ........................ 416/436 R |
| 1,615,675 | 1/1927 | Bender . |
| 1,758,560 | 5/1930 | Currie ............................. 416/236 R |
| 1,835,018 | 12/1931 | Darrieus . |
| 1,935,097 | 11/1933 | Nelson .............................. 170/15 |
| 2,067,542 | 1/1937 | Penton ............................... 170/12 |
| 2,406,268 | 8/1946 | Terhune .............................. 170/26 |
| 3,339,078 | 8/1967 | Crompton ........................... 290/44 |
| 3,902,072 | 8/1975 | Quinn ................................ 290/44 |
| 3,942,909 | 3/1976 | Vengst ............................ 416/132 B |
| 3,977,409 | 8/1976 | Luchuk ............................. 416/145 |
| 3,994,621 | 11/1976 | Bogle ............................... 415/186 |
| 4,031,405 | * 6/1977 | Asperger ............................ 290/55 |

(List continued on next page.)

FOREIGN PATENT DOCUMENTS

| | | | |
|---|---|---|---|
| 867380 | 2/1953 | (DE) . | |
| 167694 | 1/1986 | (EP) | .................................. 415/4.2 |
| 0216384 | 4/1987 | (EP) . | |
| 515652 | 4/1921 | (FR) . | |
| 727519 | 3/1931 | (FR) . | |
| 61140 | 3/1955 | (FR) | ................................. 416/236 |
| 2231805 | 11/1990 | (GB) . | |
| 69701 | 5/1980 | (JP) | ............................... 416/197 A |

*Primary Examiner*—Nicholas Ponomarenko
(74) *Attorney, Agent, or Firm*—Santangelo Law Offices, P.C.

(57) ABSTRACT

The present invention relates to a wind turbine used to convert wind energy into mechanical energy, more specifically, a long axis type of vertical-axis turbine allowing large columns of air to be harnessed. These devices differ from horizontal-axis (propeller) type windmills which typically rotate about a vertical axis in order that they may face directly into a wind. The present invention is designed to be employed as a cost effective alternate power source in any wind condition from a breeze to a gale wind. To increase the structural integrity, the torque generating elements, namely, the rotor blades, are not directly attached to the shaft but rather, they attach to the round top and bottom rotor cage plates through which torque forces generated can be transfered to the shaft. The unique design of an open cover on the top of the wind turbine allows wind from the direction above the wind turbine to be harnessed. The top shield structure has created a calm wind area between the shield and the top of the rotor cage that helps reduce turbidity and greatly facilitates wind exhaust from the system.

72 Claims, 11 Drawing Sheets

U.S. PATENT DOCUMENTS

| | | | |
|---|---|---|---|
| 4,035,658 | 7/1977 | Diggs | 290/55 |
| 4,045,144 | 8/1977 | Loth | 415/1 |
| 4,075,500 | 2/1978 | Oman et al. | 290/55 |
| 4,140,433 | 2/1979 | Eckel | 415/2 |
| 4,168,439 | 9/1979 | Neto Palma | 290/44 |
| 4,204,799 | 5/1980 | de Geus | 415/2 |
| 4,247,252 | 1/1981 | Seki et al. | 416/44 |
| 4,247,253 | 1/1981 | Seki et al. | 416/44 |
| 4,291,233 | 9/1981 | Kirschbaum | 290/1 C |
| 4,362,470 | 12/1982 | Lascastro et al. | 416/197 A |
| 4,415,814 | 11/1983 | Martinez | 290/55 |
| 4,474,529 | 10/1984 | Kinsey | 415/2 R |
| 4,551,631 | 11/1985 | Trigilio | 290/55 |
| 4,571,152 | 2/1986 | Tater | 415/4 |
| 4,632,637 | 12/1986 | Traudt | 416/41 |
| 4,652,206 | 3/1987 | Yeoman | 415/4 |
| 4,695,736 | 9/1987 | Doman et al. | 290/44 |
| 4,748,339 | 5/1988 | Jamieson | 290/55 |
| 4,818,181 | 4/1989 | Kodric | 416/196 A |
| 4,834,610 | 5/1989 | Bond, III | 415/3 |
| 4,850,792 | 7/1989 | Yeoman | 415/4.2 |
| 5,083,039 | 1/1992 | Richardson et al. | 290/44 |
| 5,380,149 * | 1/1995 | Valsamidis | 415/2.1 |
| 5,391,926 | 2/1995 | Staley et al. | 290/55 |
| 5,503,530 * | 4/1996 | Walters | 416/197 A |
| 5,852,331 * | 12/1998 | Giorgini | 290/55 |

* cited by examiner

WIND TURBINE SYSTEM

This application claims the benefit of a provisional application (Ser. No.60/110,519), filed on Dec. 1, 1998. The contents of that application are hereby incorporated by reference.

BACKGROUND OF INVENTION

The present invention relates to wind turbines used to convert wind energy into mechanical energy, more specifically, vertical-axis turbines. Vertical-axis turbines are typically of a long axis type, allowing large columns of air to be harnessed. These devices differ from horizontal-axis (propeller) type windmills which typically pivot about a vertical axis in order that they may face directly into a wind. The present invention more specifically relates to vertical-axis turbines designed to be employed as a cost effective alternate power source in any wind condition.

Wind as a source of energy is a concept that has been promoted for some time. According to one source, there is evidence which shows that windmills were in use in Babylon and in China as early as 2000 B.C. The U.S. Patent and Trademark Office has granted patents on windmill devices dating back to the early to mid 1800's. Despite the continued research and development in this age old technology, until the present invention, no windmill or wind turbine device has successfully appropriately addressed some of the most important problems which have seemingly made the harnessing of wind not economically feasible. While wind is unquestionably a large potential source of energy, estimated to be about 5 kW per acre in the United States, its variability in velocity has made it an unreliable source. Many devices such as U.S. Pat. No. 4,850,792 to Yeoman, U.S. Pat. No. 4,035,658 to Diggs and U.S. Pat. No. 2,406,268 to Terhune have relied on the ability of concentrating low to moderate winds for producing power. Others, like those shown in U.S. Pat. No. 4,834,610 to Bond and U.S. Pat. No. 4,075,500 to Oman, et al. (a horizontal-axis turbine), have accomplished the harnessing variable wind speeds by using modern variable speed governors. No device currently known to the present inventors is capable of adequately harnessing low and high-winds for power production. High winds are characterized, for purposes of discussion as currents having average velocities above 45 m.p.h., or having gusts greater than 60 m.p.h. Many devices are designed to fold and/or feather in winds reaching certain levels. Such devices are illustrated in U.S. Pat. No. 4,818,181 to Kodric, U.S. Pat. No. 4,632,637 to Traudt, and U.S. Pat. No. 3,942,909 to Yengst. These techniques, while intended to protect the structural integrity of the windmill, decrease a device's ability to produce power. Others, such as U.S. Pat. No. 5,391,926 to Staley and Elder, attempt to harness high winds emanating from any direction for power production but low to moderate winds have been unable to produce adequate torque for continual reliable power generation. Until the present invention variable winds have been an untapped source of energy by those skilled in the relevant art.

In the past, wind driven power generators of all sorts have attempted to harness the energy present in the wind. Some have concentrated their efforts in the low to moderate wind range and suffer periodic damage from the occasional high wind while others work well in the moderate to high wind range with little or no success in harnessing low speed wind. No prior art has effectively drawn useable power from the slight breeze all the way to gale force winds. Perhaps one of the biggest reasons for the lack of all wind turbines has to do with the structural integrity of typical wind devices. By design many are lightweight, inadequately supported, and made from insufficient materials. A number of these devices are comprised of a multitude of moving parts, such as rotors, stators, vanes, shields, and the like. These parts not only compromise the integrity of the machine, but also require continuous maintenance, repair and/or replacement. For such a device, which may produce only a few kilowatts of power, the costs soon begin to outweigh the benefits. Another concept widely used is to build large multi-story wind turbines capable of producing at or near the megawatt level. Two such devices are shown in U.S. Pat. No. 3,902,072 to Quinn, and U.S. Pat. No. 3,994,621 to Bogie. It is believed that these devices would cost close to $100 million to build and several hundred thousand to maintain each year. Another example is the 1.25 MW generator installed near Rutland, Vermont. This is believed to be the largest windmill ever built in the United States, having two main blades each 175 feet in diameter. This facility operated intermittently between 1941 and 1945, during the war years when most resources were being used for war efforts. In 1945 one of the blades broke due to material fatigue and was never repaired, presumably due to a lack of cost efficiency. Similar to the smaller units, these large devices become cost prohibitive on a much larger scale. The present invention solves this second problem by presenting a low cost, low maintenance, cost efficient wind turbine. While certain aspects of the design have been known, until the present invention the proper combination of elements, new and old, has not been achieved to provide a commercially viable product.

Variable wind velocity is not, of course, the only obstacle in harnessing kinetic energy from the wind. Wind direction has been another area of study and development. Wind currents are typically unpredictable, and due to topography, upper air disturbances, changing weather patterns, or seasonal variations, they rarely blow in the same direction for any substantial length of time. For this reason effective wind machines must be capable of immediately accommodating winds from a full 360 degrees. Some devices have attempted to accomplish this goal with pivoting shields, and stators or wind directing vanes. U.S. Pat. No. 4,474,529 to Kinsey, U.S. Pat. No. 537,494 to Stevens et al., the Yengst patent, and many other devices illustrate such an approach. As mentioned previously, additional moving parts usually detract from a machine's cost effectiveness. While not in the field of the present invention horizontal-axis machines typically pivot the entire rotor assembly so that it may face upwind. Still other designs leave the rotor assembly open (that is, no wind directing vanes or stators are utilized) so that winds from any horizontal direction may impart rotation upon the rotor assembly. This leaves the rotor completely open to the harshness and destructive abilities of the wind. Once again the present invention solves this problem by providing 360 degrees of wind reception, in all types of wind conditions.

The present invention, in its various embodiments, recognizes and addresses these and other problems and overcomes many limitations encountered by those skilled in the art. Many devices and procedures have taught the use of folding or feathering in high wind conditions, and thus have been unable to realize the potential power of high winds. Others, such as the Staley and Elder patent have attempted to address the damaging characteristics of high winds by stressing structural integrity and durability to the point of sacrificing the ability to produce adequate torque in the low to moderate wind speed range. It is not economically feasible to build a wind turbine that can only produce mechanical power during periods of high wind. The entire range of wind conditions must be fully utilized for a wind turbine to be commercially viable. Problems such as high cost and high maintenance of most wind energy facilities exist in the field, but such problems have not been adequately addressed by those skilled in the art. While high velocity wind is a well known natural occurrence with high kinetic energy, its value in the field of vertical-axis wind turbines has not only been ignored to some extent, it has often been looked upon as a detriment. The prior art has taught away from the present invention by stressing rotor attachment and stator curvature. Rather than supplying a system which affords only an incremental increase in performance over the prior art, the present invention utilizes techniques which were not previously considered in order to achieve what may perhaps be leaps in performance compared to the prior art. Further, the present invention has achieved a more full utilization of a previously untapped precious natural resource, the wind.

SUMMARY OF INVENTION

The present invention discloses a wind turbine to operate in all wind conditions, such as velocities up to 130 mph, and frequently changing wind directions. The device provides a reliable and effective means for directing air currents into and out of the rotor cage assembly. Rather than supplying a system which affords only an incremental increase in performance and design over the prior art, the present invention utilizes combinations and techniques which were not previously considered to achieve an increase in performance unparalleled by the prior art. This invention serves to operate with a minimum number of movable parts and systems, to optimize potential power production by allowing energy from high winds to be harnessed as well as low and moderate winds, and to optimize air current intake and exhaust by providing immediate accommodations to winds from any given direction.

In general terms, the invention involves various embodiments of a vertical-axis wind turbine. Many of the elements of this device achieve several different objectives which, when combined, act to achieve the mentioned increases in performance. In the preferred embodiment, the invention discloses stationary stators for more effectively directing currents into the rotor cage assembly to impart a higher rotational velocity and greater torque upon the turbine shaft through some torque generating elements such as the rotor blades. In addition, the stationary stators provide a structural integrity necessary for operation during high wind conditions. This aspect also prevents the disruption of rotation by shielding the rotors from winds counter-directional to their rotation which may occur as the wind shifts.

Importantly, the invention breaks from several time honored traditions in harnessing wind energy. By recognizing and utilizing the potential energy of all winds, and by designing an apparatus with resistance to the destructiveness of these winds during standard operation the present invention achieves its goals.

Accordingly, the present invention provides an omni-wind, vertical-axis turbine. The stated invention acts to convert wind currents into mechanical energy which energy may then be transferred from a turbine or the like to be used to directly act upon a water pump, or to drive an electrical generator (or more generically an energy-utilizing device) for use as an alternate power source. The turbine may be equipped with any number of rotors and stators which interact with the variable wind currents during operation. In addition, a minimum number of moving parts is used to increase reliability, to decrease maintenance, and to decrease production costs.

It is an object of the present invention to provide a design which is capable of operation in a variety of wind conditions. Such conditions include, but are not limited to, winds from any direction which possess a horizontal component, even where such wind direction is capable of frequent changes, winds reaching velocities of 130 m.p.h. or more, and winds with continuously changing velocities. It is an object that the present invention be capable of standard operation during these conditions without any need for employing folding and feathering techniques, or a speed control or braking system.

It is another object of the present invention to provide a design which is capable of immediately accommodating winds from any direction having a horizontal component, as stated earlier. It is an object that this immediate readiness of the present invention be achievable with no moving parts.

It is, therefore, an object of the present invention to provide a design which utilizes a minimum of moving parts for improved reliability. It is an object that necessary maintenance and replacement of any parts should be minimized, and the durability of the entire apparatus be vastly improved.

Naturally, further objects of the invention are disclosed throughout other areas of the specification and claims.

BRIEF DESCRIPTION OF DRAWINGS

Drawing 1 is a perspective view of an embodiment of the invention from the side.

Drawing 1A is a perspective of the new invention from the top.

Drawing 2 is a view of the rotor cage from the side.

Drawing 2A is a conceptual drawing of the rotor cage assembly from the side.

Drawing 3 is a perspective view of the rotor cage from the top showing the alignment of the rotor blades.

Drawing 4 is a view of the stator blades from the side.

Drawing 4A is a conceptual drawing of the stator blades from the side.

Drawing 4B is a top view of the stator blades showing their alignment.

Drawing 5 shows the stator cage cover which allows the invention to be "topless."

Drawing 6 is a view of the top shield from the side.

Drawing 7 is a perspective view of the top shield from above.

DETAILED DESCRIPTION OF THE PREFERRED EMBODIMENTS

The following descriptions and referenced drawings are for selected preferred embodiments of the present invention. Naturally, changes may be made to the disclosed embodiments while still falling within the scope and spirit of the present invention and the patent granted to its inventor.

Figure 1:
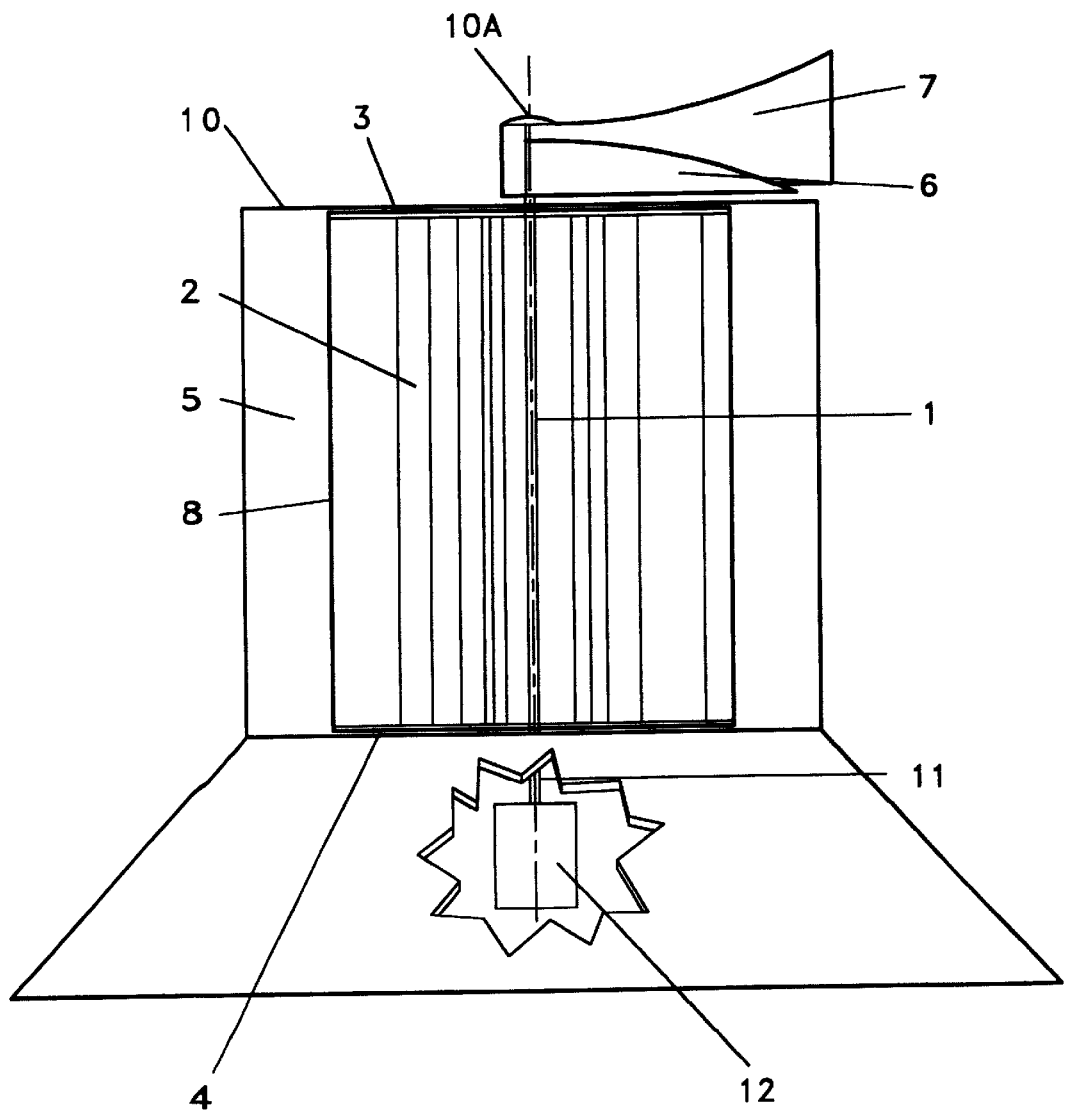
Figure 1A:
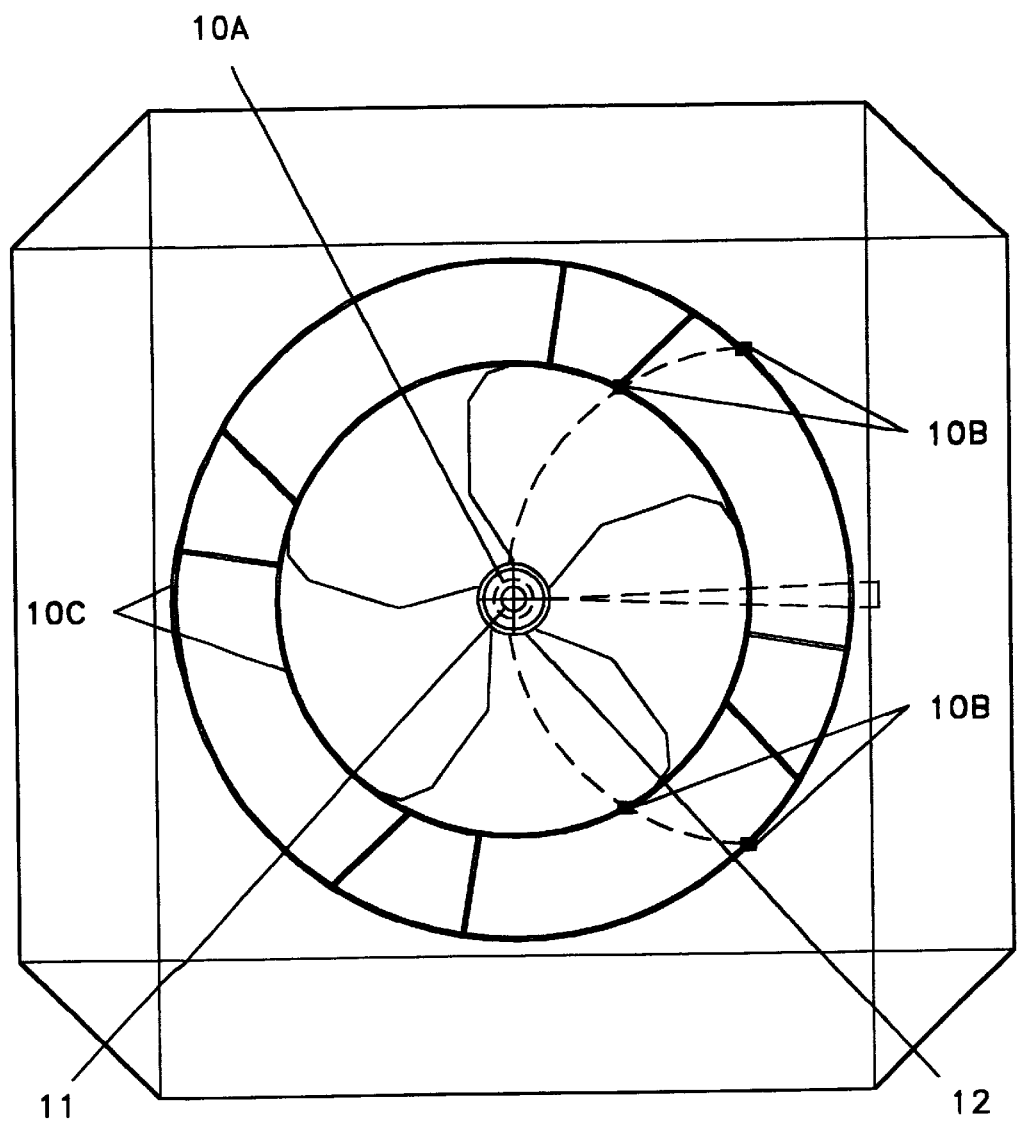

As can be seen from the drawings, the basic concepts of the present invention may be embodied in many different ways. FIGS. 1 and 1A show the preferred embodiment of the wind turbine (8) having a shaft (1) that is turned by rotor blades (2) that are attached to a top rotor cage plate (3) and bottom rotor cage plate (4) then drive an energy-transfer element (11) and an energy-utilizing device (12) (both shown as contained within or at the base). The height of these rotor blades in one of the preferred embodiments is 4 feet 8 inches but will vary proportionally with the size of the unit built. Wind is compressed and directed to the rotor blades (2) by numerous stator blades (5). Wind with a downward diagonal thrust can be accommodated by the rotor blades (2) through use of an open stator cage cover (10) that renders the turbine (8) at least partially topless and increases efficiency by up to an estimated 20% over any prior art. Wind attempting to enter the turbine (8) against the prevailing wind direction and hence against the direction of the rotors is deflected by top shield (6). Top shield (6) has a central pivoting point and an outer terminus and moves about the open top of turbine (8) by use of a center bearing (10A) side bearings (10B) and bearing race (10C). The movement of the top shield (6) to a downwind position is aided by the top shield vane (7). The top shield (6) creates an area on the downwind side of the turbine (8) that is of low turbidity and increases the invention's ability to exhaust wind passing through the machine. The top shield (6) does not at any time hinder the accommodation of productive winds from any direction.

Figure 2:
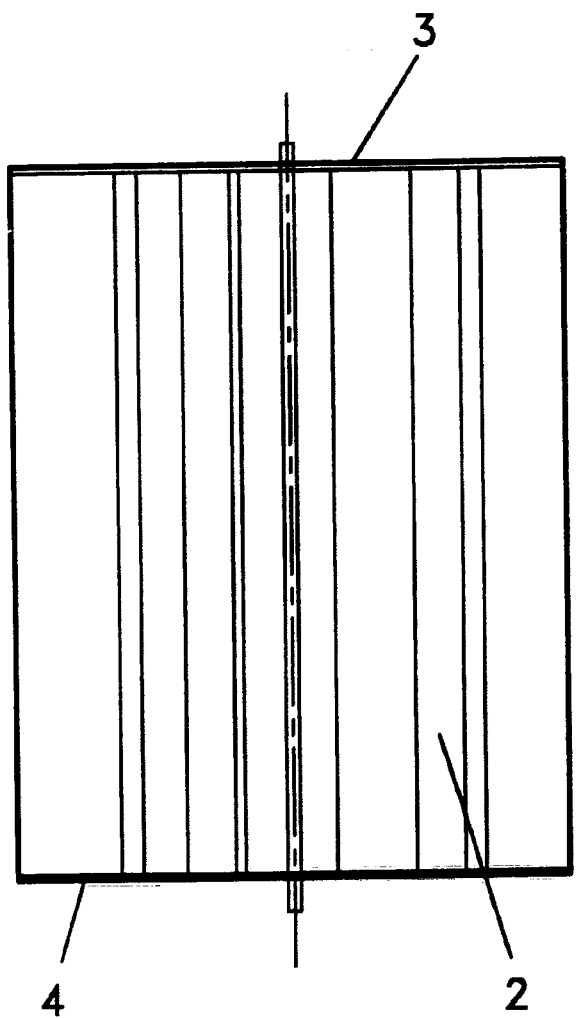
Figure 2A:
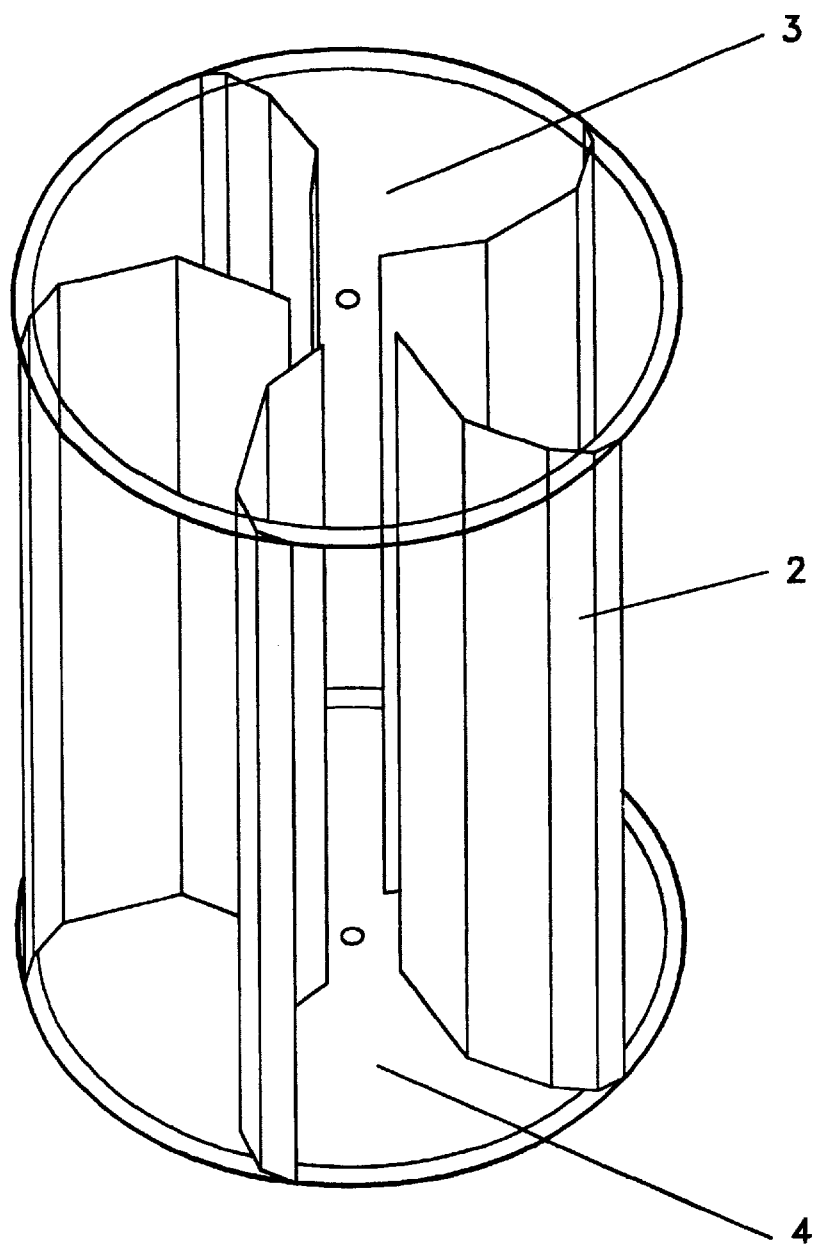

FIGS. 2 and 2A show the rotor cage (1) which may be of a double wall design constructed of a lightweight composite material as is commonly used in the aircraft and boating industries. Total rigidity and structural integrity may be enhanced by the top rotor cage plate (3) and the bottom rotor cage plate (4).

Please note that the top plate (3) may be arced slightly to better compress and direct air into the rotor cage. A reverse angle on the bottom rotor cage plate (4) may accomplish the same task but with an upward thrust.

Only the top and bottom rotor cage plates [(3) and (4) respectively] may be attached to the shaft. This unique aspect can aid in the invention's ability to readily accept, utilize and exhaust wind. Structural integrity and rigidity may be enhanced by the rotor blades being attached in two places rather than directly to the shaft as in previous art.

Figure 3:
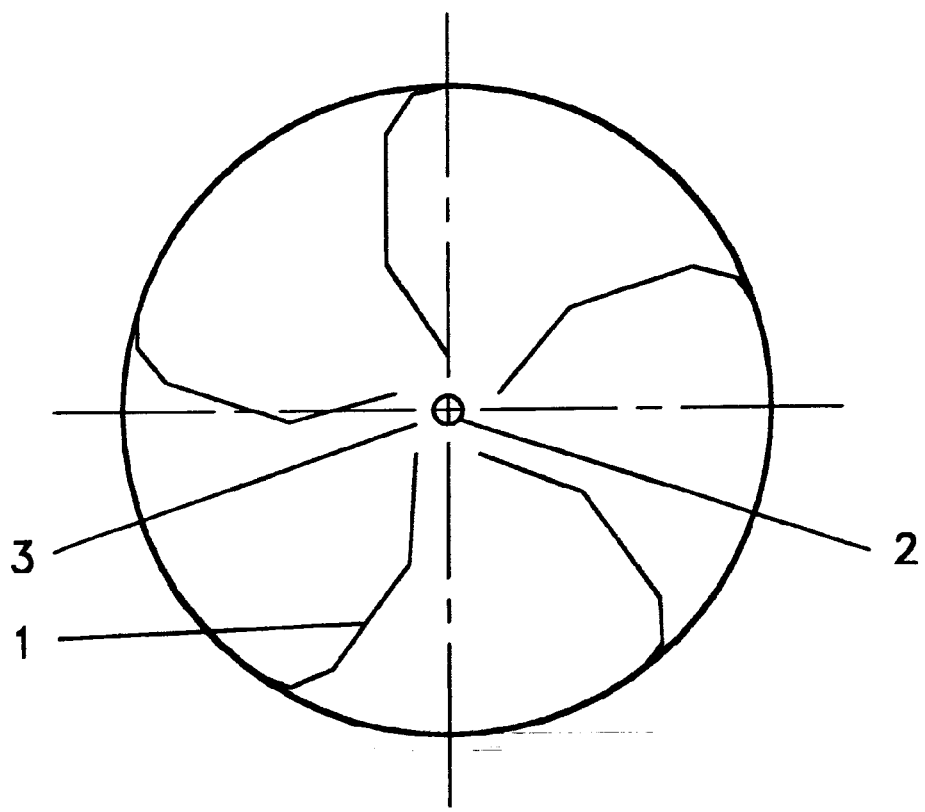

FIG. 3 shows the layout of the rotor blades (1) with respect to each other as well as to the shaft (2). Special note should be taken of the space (3) between the shaft (2) and the inside edge of the rotor blades (1). This space is a substantial component of one embodiment of the invention in a number of ways. First, by allowing some of the air to flow through the center of the machine, the air impacts the blade on the downwind side of the invention adding to thrust and aiding in the exhaust cycle. The space between the shaft and rotor can also achieve greater torque by pushing the kinetic energy of the wind to be exerted further away from the center point (i.e., the shaft). The flat surfaces of the rotor blades allow wind to impart its force and be immediately deflected. A curved or cupped surface (as described in previous art) may allow air to collect in the curvature and cushion the force of subsequent winds. The layout of the rotor cage in the preferred embodiment is shown but it must be mentioned that changes may be made to the layout without departing from the broad aspect of the present invention.

The deflected air from the rotor blades is also able to find its way through the space between the shaft and the rotor blades to aid in the invention's ability to exhaust. The space between the rotor blades and the shaft in the preferred embodiment vary proportionately with the size of the unit built.

Figure 4:
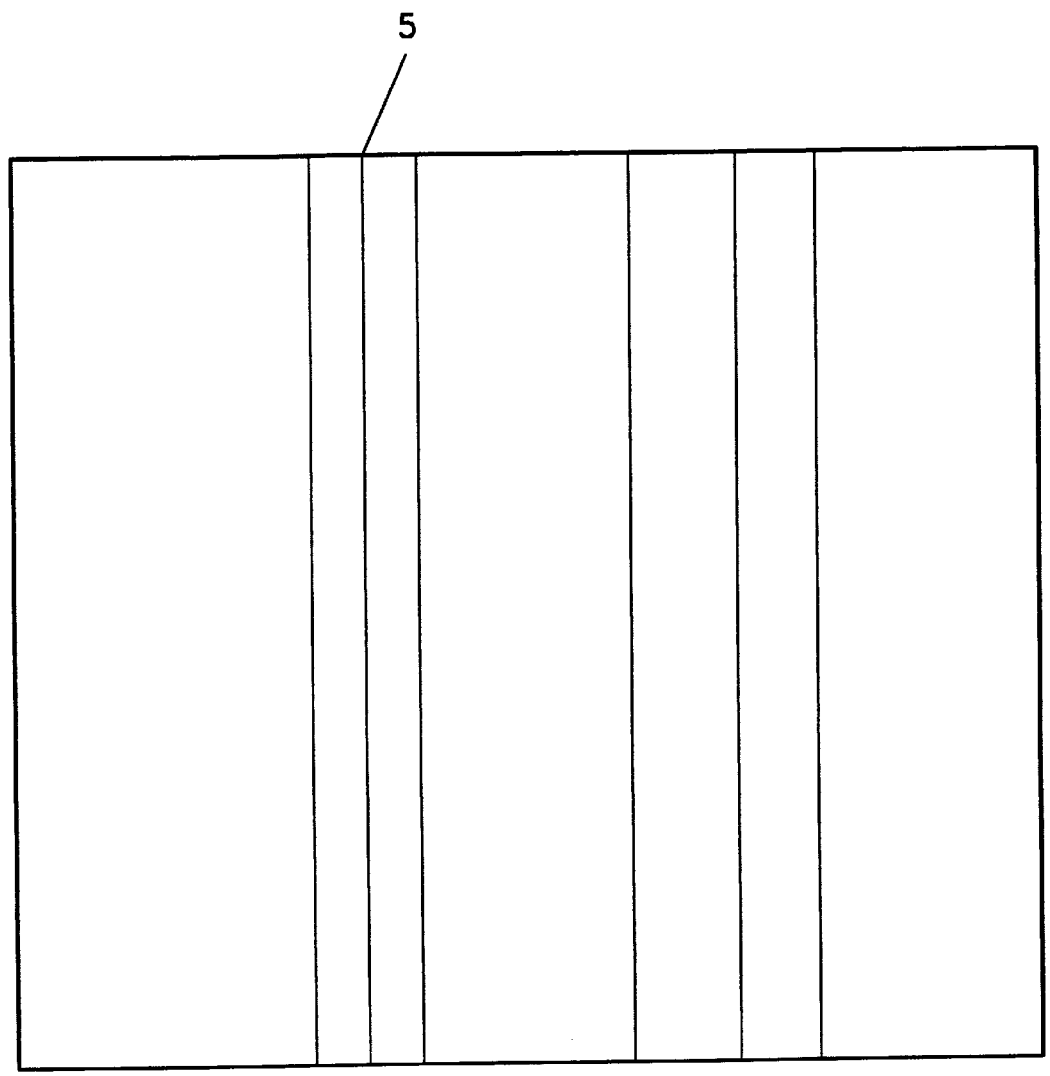
Figure 4A:
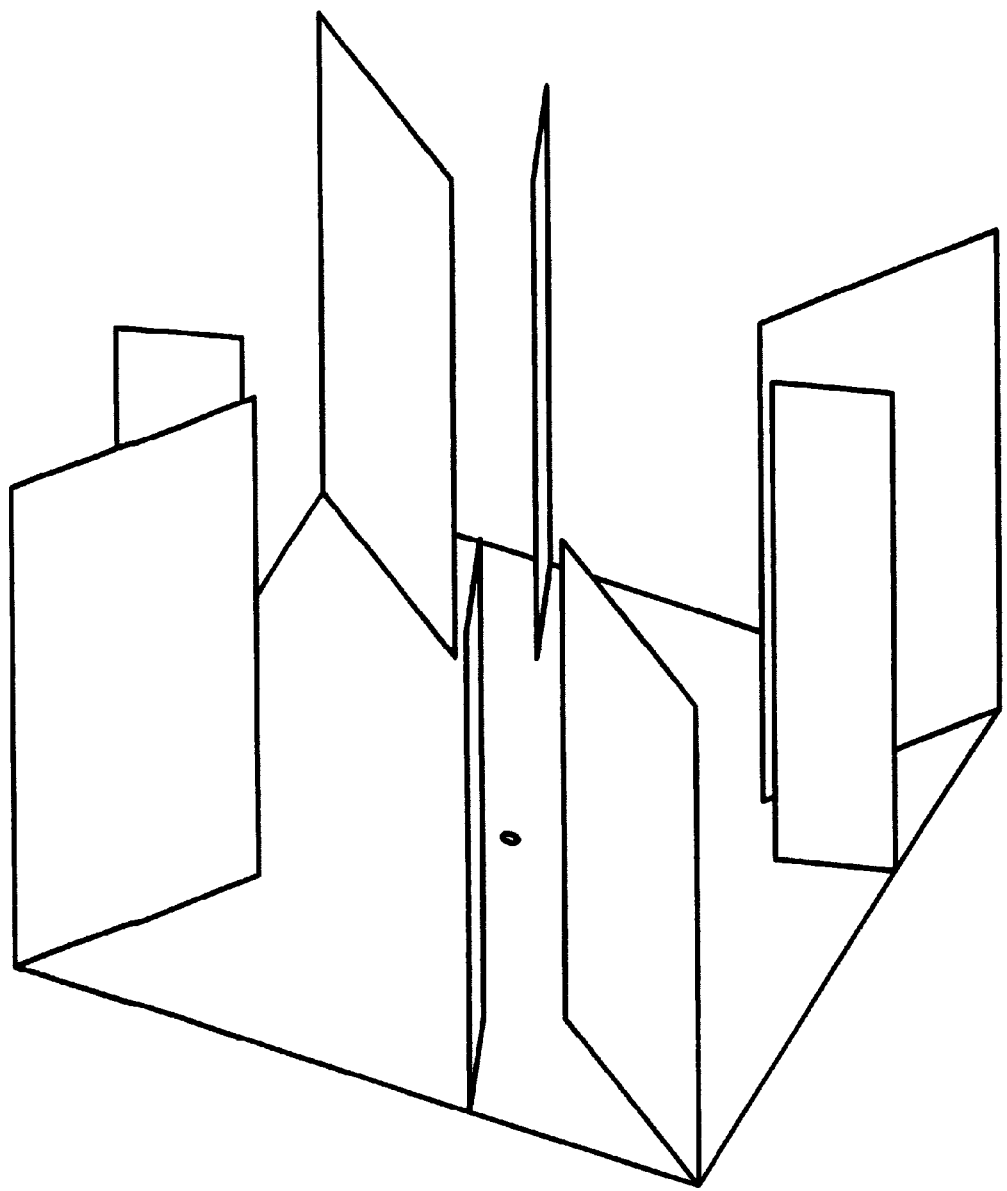
Figure 4B:
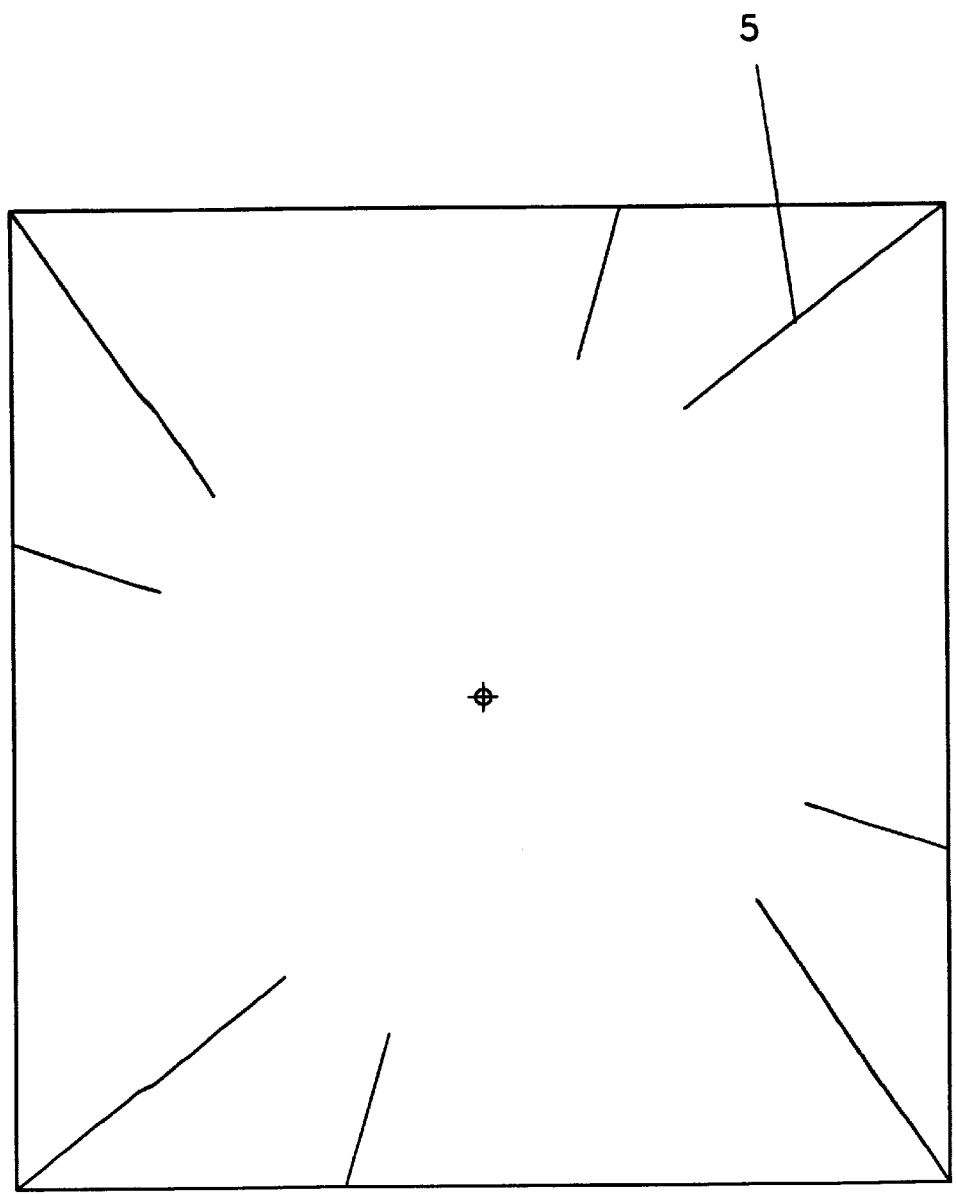

In FIGS. 4, 4A and 4B, the stator blades (5) are arranged around the circumference of the rotor cage in equidistant pairs. In the preferred embodiment 8 blades are shown but more or fewer blades could be used without substantially departing from the broad aspect of the present invention.

Unlike previous art, which had curved stator blades it has been found that straight stators that are offset from the center point allows air to enter the turbine with less turbidity and thus more force. When an attempt is made to bend or change the direction of air currents (as previous art has done with curved stator blades) the force of the wind may be greatly diminished. Straight stators, while directing air into the invention, can have a minimal effect on the loss of kinetic energy. The wind turbine has been designed to accept all available winds regardless of their speed and thus has no need for a stator design that would dampen or lessen the force of the wind. The stator blades may be constructed of the same lightweight composite as the rotor cage and are of a double wall design. The width of the double walls enhances structural stability and rigidity while the resultant stator blades are lightweight and are easily shipped and erected.

The overall weight of the components can be an integral part of the invention. While mass (i.e., weight) can be used to dampen or deaden vibration, the new invention operates so smoothly that lightweight materials will not jeopardize structural integrity and will allow the turbine to be placed atop existing buildings or in environmentally sensitive areas or areas where large erection equipment would have no access.

Figure 5:
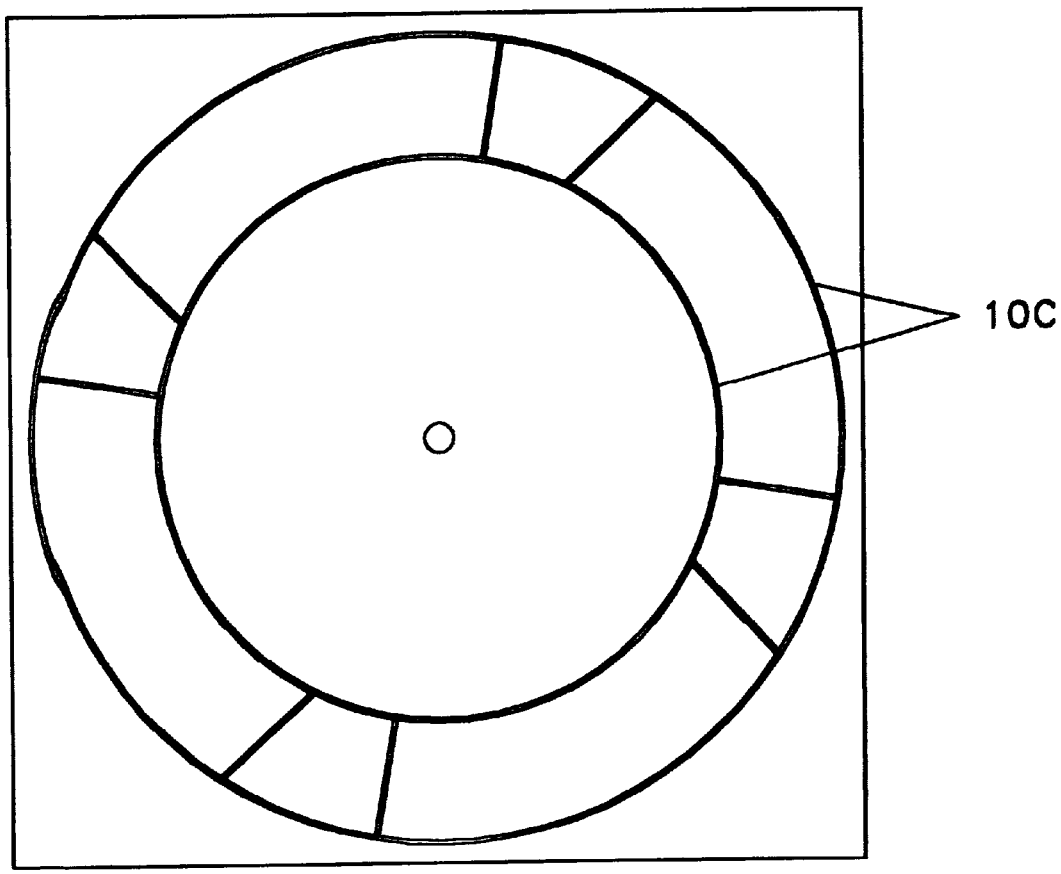

FIG. 5 depicts the alignment of the stator cage cover. This is the part of the invention that allows the turbine to be virtually topless with regard to incoming currents of air. Once properly attached to the stator blades, the turbine is structurally sound and is ready to withstand winds in excess of 100 m.p.h. Air currents approaching the rotor cage that have a slightly downward thrust pass through the open top (between the bearing races) and impact the rotor blades creating rotation. Previous art was able to accommodate wind currents that moved horizontally only, and thus, were able to accommodate only a portion of the wind that can be handled by the new invention.

The stator cage cover may be constructed of rigid steel with concentric braces to ensure structural stability. On the top side of the concentric braces are bearing races to accommodate the top shield bearings.

Figure 6:
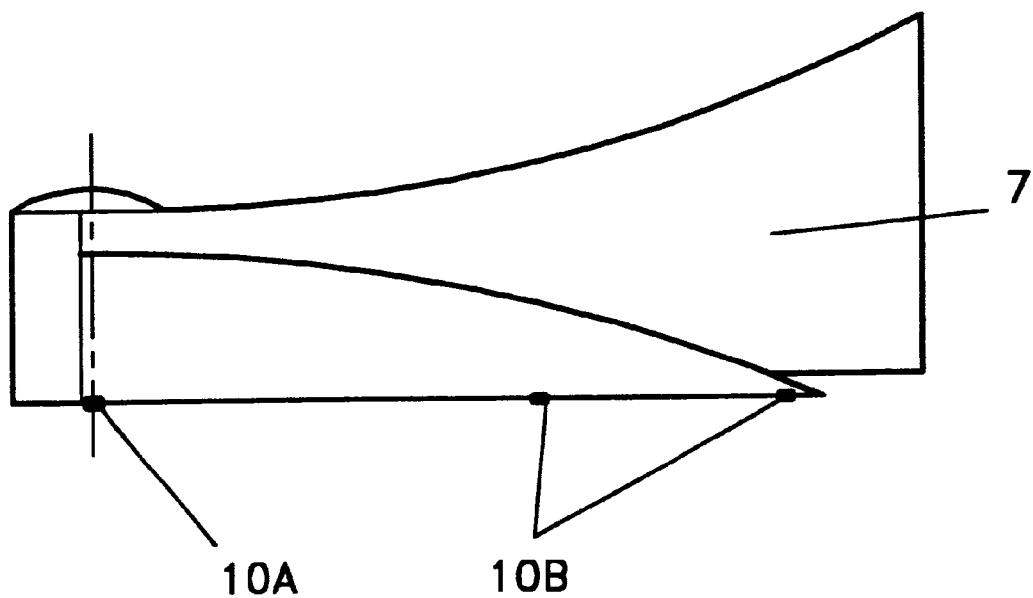
Figure 7:
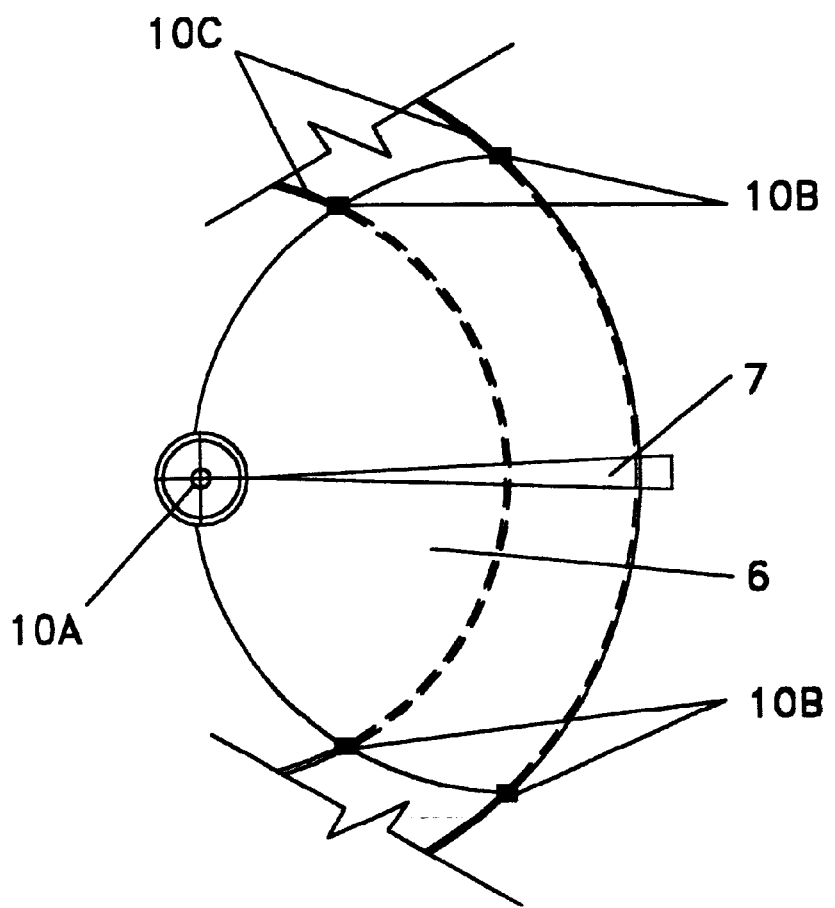

FIGS. 6 and 7 show the top shield and top shield vane (also constructed of lightweight composite). The top shield may be laminated for strength while the vane can be a double wall design to create enough drag to rotate the top shield to a downwind position.

Once the shield is in proper position, wind with a downward thrust is also allowed to enter the wind turbine. (Modeling done to date shows that the open top embodiment increases performance by up to about 20%.) The top shield prevents conflicting winds from entering the invention from the downwind side that would interfere with rotation or exhausting. The space between the top shield and the rotor cage can create a space of calm air that may improve the invention's exhausting characteristics and that has a dampening feature. The front side or upwind side of the top shield is slightly convex on the horizontal plane and may prevent the top shield from buffeting during periods of high winds. The center bearing (10A) of the top shield (6) can allow the mechanism to pivot easily while wheels or bearings (10B) resting on the concentric bearing races (10C) may carry the weight of the top shield. The wind vane or tail of the top shield (7) can aid in the top shield's ability to move into a position opposing the wind and may enhance the shield's stability during operation.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "shield" should be understood to encompass disclosure of the act of "shielding"—whether explicitly discussed or not—and, conversely, were there only disclosure of the act of "shielding", such a disclosure should be understood to encompass disclosure of a "shield." Such changes and alternative terms are to be understood to be explicitly included in the description.

The foregoing discussion and the claims which follow describe the preferred embodiments of the present invention. Particularly with respect to the claims, it should be understood that changes and modifications may be made without departing from its essence and the broad aspects of the present invention. In this regard, it is intended that such changes and modifications would still fall within the scope of the present invention. It simply is not practical to describe and claim all possible revisions to the present invention which may be accomplished. All the various combinations and permutations of each of the claims should also be understood as disclosed through this application. To the extent such revisions utilize the essence of the present invention, each would naturally fall within the breadth of protection encompassed by this patent. This is particularly true for the present invention since its basic concepts and understandings are fundamental in nature and can be broadly applied.

In addition, it should be understood that, in the claims and in the application, the term "comprising" is meant to have an inclusive meaning rather than an exclusive one. It should be interpreted in its most expansive form so as to afford the applicant the broadest coverage legally permissible. Therefore, in countries, such as Australia, this term is not intended to have an exclusive, or more limited, meaning.

Any references mentioned in the application for this patent or cited in an information disclosure statement are hereby incorporated by reference, however, to the extent statements might be considered inconsistent with the patenting of this invention such statements are expressly not to be considered as made by the applicant.

I claim:

1. A vertically rotating wind turbine, comprising:
   a. a wind-collecting base with a bottom surface defining an area and a top surface defining an area wherein said area of said bottom surface is larger than said area of said top surface and wherein said top surface comprises an energy-transfer element and wherein said wind-collecting base comprises an upward tapered base having an angle to smoothly lead wind currents to said flat wind directing elements;
   b. a vertically rotating shaft with a top end and a bottom end wherein said bottom end is mechanically connected to said energy-transfer element;
   c. an energy-utilizing device responsive to said shaft through said energy-transfer element of the top surface of said base;
   c. a round top plate attached in the vicinity of the top end of said vertically rotating shaft;
   d. a round bottom plate that defines a diameter and is attached to said vertically rotating shaft at a location above the top surface of said base;
   e. a plurality of vertically oriented torque generating elements having outer edges and inner edges which are located circumferentially around said vertically rotating shaft between said round top plate and said round bottom plate and are attached to said round top plate and said round bottom plate at their ends to form a cage assembly;
   f. a plurality of vertically oriented flat wind directing elements arranged circumferentially around said cage assembly and adjacent to said outer edges of said vertically oriented flat torque generating elements;
   g. an open cover comprising concentric braces comprising two side bearings;
   h. a top shield having a central pivoting point and an outer terminus above said side bearings of said open cover; and
   i. a top shield vane.

2. A vertically rotating wind turbine as described in claim 1 wherein said angle to smoothly lead wind currents to said flat wind directing elements is between 20° to 45°.

3. A vertically rotating wind turbine as described in claim 2 wherein said top surface of said base comprises a square surface, wherein said bottom surface of said base comprises 8 corners and wherein said base comprises a special spacial geometry that has planar surfaces connecting said bottom surface to said top surface.

4. A vertically rotating wind turbine as described in claim 1 wherein said vertically rotating shaft is responsive to said cage assembly and passively rotates.

5. A vertically rotating wind turbine as described in claim 1 wherein each of said plurality of vertically oriented torque generating elements is solely attached to said round top plate and said round bottom plate at its ends to form said cage assembly.

6. A vertically rotating wind turbine as described in claim 5 wherein each of said torque generating elements has at least three differently oriented surfaces.

7. A vertically rotating wind turbine as described in claim 6 wherein each adjacent pair of said differently oriented surfaces comprises an angle wherein said angle is about 147°.

8. A vertically rotating wind turbine as described in claim 7 wherein said plurality of said torque generating elements is 5.

9. A vertically rotating wind turbine as described in claim 8 wherein said torque generating elements are free from said vertically rotating shaft wherein each of said inner edges of said torque generating elements and said vertically rotating shaft form a free space.

10. A vertically rotating wind turbine as described in claim 9 wherein said free space comprises an exhaust space.

11. A vertically rotating wind turbine as described in claim 9 wherein said torque generating elements comprise rotor blades.

12. A vertically rotating wind turbine as described in claim 11 wherein each of said rotor blades is about 4'8" in height.

13. A vertically rotating wind turbine as described in claim 12 wherein said rotor blades immediately accommodate all wind conditions from the full 360 degrees.

14. A vertically rotating wind turbine as described in claim 13 wherein said cage assembly comprises a rotor cage assembly wherein said top round plate is a top rotor cage plate and said bottom round plate is a bottom rotor cage plate.

15. A vertically rotating wind turbine as described in claim 14 wherein said rotor blades are capable of imparting rotation force upon said vertically rotating shaft indirectly through said rotor cage assembly during periods of sufficient air currents.

16. A vertically rotating wind turbine as described in claim 15 wherein said rotor cage assembly is capable of responding to a change in wind direction.

17. A vertically rotating wind turbine as described in claim 16 wherein said rotor blades are responsive to all wind currents having velocities as slow as 5 mph and as high as 130 mph.

18. A vertically rotating wind turbine as described in claim 17 wherein said rotor blades have a double wall design.

19. A vertically rotating wind turbine as described in claim 1 wherein said flat wind directing elements are attached to said base in equidistance pairs.

20. A vertically rotating wind turbine as described in claim 19 wherein said flat wind directing elements comprise at least two pairs.

21. A vertically rotating wind turbine as described in claim 20 wherein said flat wind directing elements comprise at least four pairs.

22. A vertically rotating wind turbine as described in claim 21 wherein each pair of said flat wind direct elements are circumferentially arranged on said base and comprise a wind current pathway with an entrance opening larger than an exit opening toward said rotor blades.

23. A vertically rotating wind turbine as described in claim 21 wherein said flat wind directing elements comprise stationary stator blades.

24. A vertically rotating wind turbine as described in claim 23 wherein said stator blades comprise flat vertical surfaces that have a minimal coefficient of friction when wind currents pass through them.

25. A vertically rotating wind turbine as described in claim 24 wherein said stator blades each face a specific direction to sufficiently accommodate winds current from that specific direction.

26. A vertically rotating wind turbine as described in claim 25 wherein said stator blades comprise double walls.

27. A vertically rotating wind turbine as described in claim 1 wherein said open cover comprises an open stator cage cover.

28. A vertically rotating wind turbine as described in claim 27 wherein said open stator cage cover comprises concentric bearing races that have a center bearing and two circular side bearings.

29. A vertically rotating wind turbine as described in claim 1 wherein said top shield comprises a laminated top shield.

30. A vertically rotating wind turbine as described in claim 25 and further comprising a calm wind surface which forms a calm wind area above at least a portion of said cage assembly.

31. A vertically rotating wind turbine as described in claim 30 wherein said calm wind surface comprises a convex surface on its upwind side and a concave surface on its downwind side, wherein said downwind side forms said calm wind area above said cage assembly.

32. A vertically rotating wind turbine as described in claim 30 or 31 wherein said calm wind area comprises an exhaust area.

33. A vertically rotating wind turbine as described in claim 32 wherein said top shield covers less than about one third of said open cover area above said open cover.

34. A vertically rotating wind turbine as described in claim 33 wherein said central pivoting point of said top shield is responsive to said central bearing of said open cover, wherein said outer terminus is responsive to said outer side bearing and wherein said top shield rotates in response to wind direction.

35. A vertically rotating wind turbine as described in claim 34 wherein said top shield enhances wind harness and wherein said top shield comprises a vane.

36. A vertically rotating wind turbine as described in claim 35 wherein said vane creates enough drag force to rotate said top shield to a downwind position in response to wind directions and comprises double walls.

37. A vertically rotating wind turbine as described in claim 1 wherein said wind turbine comprises a long axis vertical turbine that is an omniwind turbine.

38. A vertically rotating wind turbine as described in claims 1, 6, 12, 20, 26, 29, 37 wherein each of said elements comprises a lightweight material.

39. A method of harnessing kinetic energy from wind currents, comprising the steps of:
 a. providing a base on which a wind turbine is set and in which an energy utilizing device is located;
 b. providing a torque generating device on said base wherein said torque generating device comprises torque generating elements, a top plate, a bottom plate and a vertical shaft;
 c. providing a kinetic energy cascade pathway wherein kinetic energy from wind currents is transferred from said torque generating elements to said shaft via said top and bottom plates;
 d. directing wind currents from breeze to high gale wind regardless of direction onto said torque generating elements;
 e. compressing said wind currents by gradually narrowing their pathways toward said torque generating elements to generate compressed wind currents;
 f. collecting said compressed wind currents;
 g. moving said torque generating elements around said shaft with said wind currents;
 h. generating a torque force using said kinetic energy;
 i. converting said torque force into mechanical energy;

j. driving said energy utilizing device with said mechanical energy; and k. smoothly exhausting said wind currents.

40. A method of harnessing kinetic energy from wind currents as described in claim 39 wherein said step of providing a base comprises the step of improving structural integrity of said wind turbine by steadily attaching said wind turbine to said base.

41. A method of harnessing kinetic energy from wind currents as described in claim 39 and further comprising the step of creating a free wind passing area in said wind turbine.

42. A method of harnessing kinetic energy from wind currents as described in claim 39 wherein said step of providing a kinetic energy cascade pathway comprises the step of utilizing a wind directing base.

43. A method of harnessing kinetic energy from wind currents as described in claim 42 wherein said step of providing a torque generating device comprises the step of utilizing curved torque generating elements.

44. A method of harnessing kinetic energy from wind currents as described in claim 42 wherein said step of providing a torque generating device comprises the step of utilizing angled torque generating elements.

45. A method of harnessing kinetic energy from wind currents as described in claim 44 wherein said step of providing a kinetic energy cascade pathway comprises the step of minimizing number of moving parts in said wind turbine.

46. A method of harnessing kinetic energy from wind currents as described in claim 45 wherein said step of minimizing said number of moving parts in said wind turbine comprises the step of minimizing the number of said angled torque generating elements.

47. A method of harnessing kinetic energy from wind currents as described in claim 46 wherein said step of providing a torque generating device on said base comprises the step of attaching said torque generating elements to said top plate and said bottom plate at their ends.

48. A method of harnessing kinetic energy from wind currents as described in claim 47 wherein said step of providing a torque generating device on said base comprises the step of attaching said torque generating elements solely to said top plate and said bottom plate at their ends.

49. A method of harnessing kinetic energy from wind currents as described in claim 48 wherein said step of providing a torque generating device comprises the step of efficiently utilizing wind kinetic energy to generate said torque force.

50. A method of harnessing kinetic energy from wind currents as described in claim 49 wherein said step of efficiently utilizing wind kinetic energy to generate said torque force comprises the step of accommodating wind currents from the full 360 degrees.

51. A method of harnessing kinetic energy from wind currents as described in claim 50 wherein said step of efficiently utilizing wind kinetic energy to generate said torque force comprises the step of accommodating all wind conditions from low to medium and to high wind conditions.

52. A method of harnessing kinetic energy from wind currents as described in claim 51 wherein said step of accommodating all wind conditions comprises the step of accommodating a breeze.

53. A method of harnessing kinetic energy from wind currents as described in claim 52 wherein said step of accommodating breeze comprises the step of reducing weight of said wind turbine by constructing said wind turbine with lightweight materials.

54. A method of harnessing kinetic energy from wind currents as described in claim 51 wherein said step of accommodating all wind conditions comprises the step of accommodating a high wind that is up to 130 mph.

55. A method of harnessing kinetic energy from wind currents as described in claims 39, 42, 45, and 50 wherein said step of providing a kinetic energy cascade pathway comprises the step of combining said torque generating elements, said top plate, said bottom plate and said vertical shaft in a way that said torque force is transferred from said torque generating elements to said vertical shaft indirectly via said top plate and said bottom plate.

56. A method of harnessing kinetic energy from wind currents as described in claim 39 wherein said step of directing wind currents from breeze to high gale wind of all directions onto said torque generating elements comprises the step of defining pathways of said wind currents.

57. A method of harnessing kinetic energy from wind currents as described in claim 56 wherein said step of compressing said wind currents comprises the step of concentrating strength of said kinetic energy.

58. A method of harnessing kinetic energy from wind currents as described in claim 57 wherein said step of moving said torque generating elements comprises the step of imparting high rotational velocity upon said vertical shaft.

59. A method of harnessing kinetic energy from wind currents as described in claim 57 wherein said step of moving said torque generating elements comprises the step of optimizing a rotating velocity of said vertical shaft.

60. A method of harnessing kinetic energy from wind currents as described in claim 59 wherein said step of converting said torque force into mechanical energy comprises the step of transferring said torque force from said vertical shaft to said energy utilizing device.

61. A method of harnessing kinetic energy from wind currents as described in claim 40 wherein said step of efficiently collecting said wind kinetic energy with said angled torque generating elements comprises the step of efficiently collecting kinetic energy from wind currents from above said wind turbine.

62. A method of harnessing kinetic energy from wind currents as described in claim 61 wherein said step of efficiently collecting kinetic energy from wind currents above said wind turbine comprises the step of opening said wind turbine from its top.

63. A method of harnessing kinetic energy from wind currents as described in claim 62 wherein said step of efficiently collecting kinetic energy from wind currents above said wind turbine comprises the step of preventing counter-prevailing wind currents from imparting upon said torque generating elements.

64. A method of harnessing kinetic energy from wind currents as described in claim 63 wherein said step of preventing counter-prevailing wind currents from imparting upon said torque generating elements comprises the step of shielding at least a partial opening area of said wind turbine.

65. A method of harnessing kinetic energy from wind currents as described in claim 64 wherein said step of shielding at least a partial opening area of said wind turbine comprises the step of providing a calm wind area on a downwind side with standard stability.

66. A method of harnessing kinetic energy from wind currents as described in claim 65 wherein said step of preventing counter-prevailing wind currents from imparting upon said torque generating elements comprises the step of shielding a downwind area above said wind turbine.

67. A method of harnessing kinetic energy from wind currents as described in claim 39 wherein said step of smoothly exhausting said wind currents comprises the step of building a free air current escape passway.

68. A method of harnessing kinetic energy from wind currents as described in claim 67 wherein said step of smoothly exhausting said wind currents comprises the step of constructing a calm area with standard stability.

69. A vertically rotating wind turbine, comprising:
  a. a base with a bottom surface defining an area and a top surface defining an area wherein said area of said bottom surface is larger than said area of said top surface and wherein said top surface comprises an energy-transfer element and wherein said base comprises an upward tapered base having an angle to smoothly lead wind currents to said flat wind directing elements;
  b. a vertically rotating shaft with a top end and a bottom end wherein said bottom end is mechanically connected to said energy-transfer element;
  c. an energy-utilizing device responsive to said shaft through said energy-transfer element of the top surface of said base;
  d. a round top plate attached to said vertically rotating shaft;
  e. a round bottom plate that defines a diameter and is attached to said vertically rotating shaft;
  f. a plurality of vertically oriented flat torque generating elements having outer edges and inner edges which are localized circumferentially around said vertically rotating shaft at a space between said round top plate and said bottom plate and are attached therein to said round top plate and said bottom plate at their ends to form a cage assembly;
  g. a plurality of vertically oriented flat wind directing elements arranged circumferentially around said cage assembly and adjacent to said out edges of said vertically oriented flat torque generating elements;
  h. an open cover comprising concentric braces;
  i. a dampening top shield above said open cover having a central pivoting point and a convex front side surface with an outer terminus above said concentric braces above said open cover; and
  j. a top shield vane.

70. A vertically rotating wind turbine as described in claim 69 wherein said dampening top shield further comprises a shield of exhausting air against counter-prevailing wind currents.

71. A method of harnessing kinetic energy from all wind conditions, said method comprising the steps of:
  a. establishing a base on which a wind turbine is set and in which an energy utilizing device is located;
  b. creating a torque generating device on said base wherein said torque generating device comprises torque generating elements, a round top plate, a round bottom plate and a vertical shaft;
  c. creating a kinetic energy cascade pathway wherein said kinetic energy is transferred from said torque generating elements to said shaft via said top and bottom plates;
  d. directing wind currents from breeze to high gale wind regardless of direction onto said torque generating elements;
  e. directionally compressing said wind currents by gradually narrowing their pathways toward said torque generating elements to generate compressed wind currents
  f. creating a top shield having an upwind surface;
  g. dampening said torque generating elements with said top shield to accommodate high wind force;
  h. collecting said compressed wind currents;
  i. kinetically, vertically and axially imparting said torque generating elements around a shaft with wind currents;
  j. generating a torque force using said kinetic energy;
  k. converting said torque force into mechanical energy;
  l. driving said energy utilizing device with said mechanical energy; and
  m. smoothly exhausting wind.

72. A method of harnessing kinetic energy from wind currents as described in claim 71 wherein said step of creating a top shield having an upwind surface comprises the step of creating a calm wind area with standard stability.

* * * * *